(12) United States Patent
Nishimura et al.

(10) Patent No.: US 10,605,299 B2
(45) Date of Patent: *Mar. 31, 2020

(54) BICYCLE CONTROL CABLE

(71) Applicant: Shimano Inc., Sakai, Osaka (JP)

(72) Inventors: Atsuhiro Nishimura, Osaka (JP); Kenji Ose, Osaka (JP); Takamoto Asakawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,116

(22) Filed: May 22, 2015

(65) Prior Publication Data

US 2015/0267738 A1 Sep. 24, 2015

Related U.S. Application Data

(62) Division of application No. 13/248,153, filed on Sep. 29, 2011, now abandoned.

(51) Int. Cl.
*F16C 1/20* (2006.01)
*B62M 25/02* (2006.01)
(Continued)

(52) U.S. Cl.
CPC ............ *F16C 1/205* (2013.01); *B60T 11/046* (2013.01); *B62L 3/00* (2013.01); *B62M 25/02* (2013.01);
(Continued)

(58) Field of Classification Search
CPC .... F16C 1/10; F16C 1/20; F16C 1/205; F16C 1/26; F16C 1/267; F16C 1/12
See application file for complete search history.

(56) References Cited

U.S. PATENT DOCUMENTS 1,900,512 A 3/1933 Madden
2,334,280 A 11/1943 Nelson
(Continued)

FOREIGN PATENT DOCUMENTS

DE 651266 C 10/1937
DE 710205 C 9/1941
(Continued)

OTHER PUBLICATIONS

Machine Translation of FR 1245753, obtained Mar. 18, 2016.*
(Continued)

*Primary Examiner* — Richard W Ridley
*Assistant Examiner* — Brian J McGovern
(74) *Attorney, Agent, or Firm* — Global IP Counselors, LLP

(57) ABSTRACT

A bicycle control cable is provided with a central wire and at least one resin string. The at least one string made of resin is spirally wound onto the radially outermost surface in a direction intersecting with a center longitudinal axis of the central wire with a pitch less than or equal to 1 millimeter. The at least one resin string defines a spiral gap between adjacent windings of the at least one resin string. The at least one resin string defines an outer sliding surface for reducing a sliding resistance of the central wire. The central wire and the at least one resin string define an inner wire configured to slidably move in an axial direction with respect to the center longitudinal axis of the central wire within an outer case to operate a bicycle component.

11 Claims, 8 Drawing Sheets

(51) Int. Cl.
*F16C 1/10* (2006.01)
*B60T 11/04* (2006.01)
*B62L 3/00* (2006.01)
*F16C 1/24* (2006.01)
*D07B 5/00* (2006.01)

(52) U.S. Cl.
CPC ............... *F16C 1/10* (2013.01); *F16C 1/20* (2013.01); *F16C 1/24* (2013.01); *D07B 5/005* (2013.01); *D07B 2201/2002* (2013.01); *D07B 2201/2037* (2013.01); *F16C 2326/20* (2013.01); *F16C 2326/28* (2013.01); *Y10T 74/20456* (2015.01)

(56) References Cited

U.S. PATENT DOCUMENTS

| | | | |
|---|---|---|---|
| 3,135,131 | A * | 6/1964 | Marr .................. F16C 1/20 138/118 |
| 3,176,538 | A | 4/1965 | Hurlow |
| 3,302,479 | A | 2/1967 | Conrad |
| 3,726,078 | A | 4/1973 | Nakamura |
| 4,099,425 | A | 7/1978 | Moore |
| 4,112,708 | A | 9/1978 | Fukuda |
| 4,158,946 | A | 6/1979 | Bourgois |
| 4,265,140 | A | 5/1981 | Nagano |
| 4,299,884 | A | 11/1981 | Payen |
| 4,427,033 | A | 1/1984 | Ege |
| 5,245,887 | A | 9/1993 | Tanaka et al. |
| 5,288,270 | A * | 2/1994 | Ishikawa .................. F16C 1/24 184/14.1 |
| 5,353,626 | A | 10/1994 | Davidson et al. |
| 5,636,551 | A | 1/1997 | Davidson et al. |
| 7,162,858 | B2 | 1/2007 | Graham |
| 7,559,189 | B2 | 7/2009 | Honda et al. |
| 7,650,814 | B2 | 1/2010 | Watarai |
| 2005/0034375 | A1 | 2/2005 | Vanderbeken et al. |
| 2009/0260474 | A1 | 10/2009 | Sudo et al. |
| 2010/0116084 | A1 | 5/2010 | Steuernagel |

FOREIGN PATENT DOCUMENTS

| | | |
|---|---|---|
| DE | 1213677 B | 3/1966 |
| DE | 10 2010 006 945 A1 | 8/2011 |
| EP | 0 834 662 A2 | 4/1998 |
| EP | 0 864 688 A1 | 9/1998 |
| FR | 1 245 753 A | 11/1960 |
| JP | 58-193116 U | 12/1983 |
| JP | 2-91255 U | 7/1990 |
| JP | 10-159832 A | 6/1998 |
| JP | 11-247078 A | 9/1999 |
| JP | 2000-130427 A | 5/2000 |
| JP | 2001-140848 A | 5/2001 |
| JP | 2006-342917 A | 12/2006 |
| JP | 2008-032063 A | 2/2008 |
| TW | 200934961 A | 8/2009 |

OTHER PUBLICATIONS

European Search Report of corresponding EP Application No. 14 16 3053.3 dated Jun. 26, 2014.
European Search Report of corresponding EP Application No. 12 18 6198.3 dated Aug. 7, 2013.
European Search Report of corresponding EP Application No. 12 18 2558.2 dated Aug. 6, 2013.

* cited by examiner

BICYCLE CONTROL CABLE

BACKGROUND

Field of the Invention

This invention generally relates to a bicycle control cable. More specifically, the present invention relates to an inner wire of a bicycle control cable such as a Bowden cable.

Background Information

Bicycles often have components that are manually operated by a bicycle control cable (e.g., a brake cable and a gear shift cable). In particular, the bicycle control cable interconnects a "manually operated part" of bicycle to a "cable operated part" of bicycle. Examples of "manually operated parts" include brake levers and gear shifters. Examples of "cable operated parts" include brake devices and the gear changing devices. Typically, conventional bicycle control cables have, for example, a tubular outer case and an inner wire that can be inserted into and passed through the outer case. This type of bicycle control cable is often called a Bowden type of bicycle control cable. The outer case of a typical Bowden cable has a synthetic resin liner against which the outside surface of the inner wire slides, a flat steel wire wound helically onto the outside circumference of the liner, and a synthetic resin jacket that covers the outside circumference of the flat steel wire. The inner wire of a typical Bowden cable is made of intertwined steel wire. The inner wire protrudes beyond both ends of the outer case and each end of the inner wire is connected to either a manually operated part or a cable-operated part. In some cases, one or each end of the inner wire has an anchor part for attachment to a brake lever, a gear shifter, etc. The anchor part is often fixed to the tip end of the inner wire by crimping or other suitable fastening method. The outer diameter of the inner wire needs to be sufficiently small relative to an internal diameter of the outer case for the inner wire to slide within the outer case. To aid in the sliding of the inner wire within the outer case, a lubricant is sometimes provided between the inner wire and the outer case. However, this lubricant becomes contaminated over time, and thus, regular maintenance is required for smooth operation of the bicycle control cable.

In view of the above, it will be apparent to those skilled in the art from this disclosure that there exists a need for an improved bicycle control cable. This invention addresses this need in the art as well as other needs, which will become apparent to those skilled in the art from this disclosure.

SUMMARY

One aspect presented in the present disclosure is to provide a bicycle control cable that has an improved sliding efficiency of an inner wire.

In view of the state of the known technology, a bicycle control cable is provided that comprises a central wire and a radial protrusion. The central wire includes at least one metallic strand defining a radially outermost surface of the central wire. The radial protrusion extends along the radially outermost surface in a direction intersecting with a center longitudinal axis of the central wire. The radial protrusion reduces a sliding resistance of the central wire. The central wire and the radial protrusion are configured and arranged to slidably move in an axial direction with respect to the center longitudinal axis of the central wire within an outer case to operate a bicycle component.

These and other objects, features, aspects and advantages of the disclosed bicycle control cables will become apparent to those skilled in the art from the following detailed description, which, taken in conjunction with the annexed drawings, discloses several embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
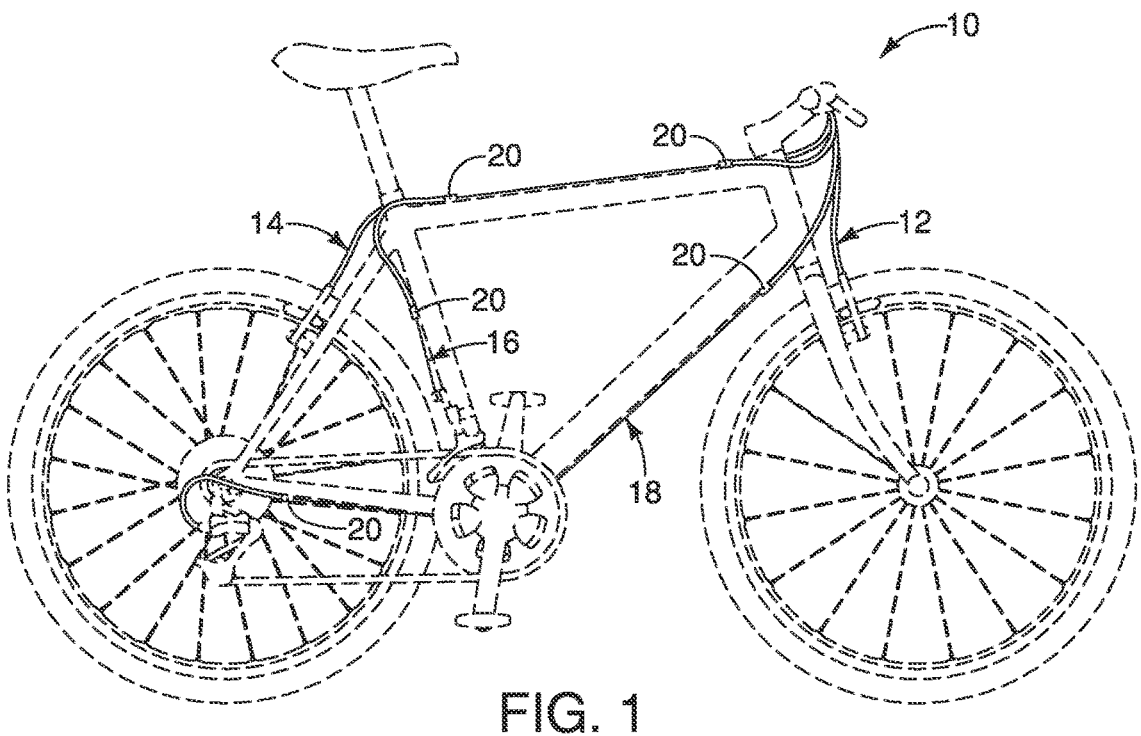
FIG. 1 is a diagrammatic side elevational view of a bicycle equipped with several bicycle control cables in accordance with illustrative embodiments.

Referring initially to FIG. 1, a bicycle 10 is illustrated that is equipped with several bicycle control cables 12, 14, 16 and 18 in accordance with illustrative embodiments as explained below. The bicycle control cable 12 is operatively connected between a front brake lever and a front brake caliper. The bicycle control cable 14 is operatively connected between a rear brake lever and a rear brake caliper. The bicycle control cable 16 is operatively connected between a front shifter and a front derailleur. The bicycle control cable 18 is operatively connected between a rear shifter and a rear derailleur. The bicycle control cables 12, 14, 16 and 18 are mounted to the bicycle 10 via a plurality of cable guides or stops 20.

Turning now to FIGS. 2 to 5, the bicycle control cable 12 will be discussed in more detail. The bicycle control cable 12 basically, includes a central wire 22 and a radial protrusion 24. Preferably, as shown, the radial protrusion 24 and the central wire 22 are attached to each other by thermal melting. In this way, the radial protrusion 24 does not move relative to the central wire 22. The central wire 22 and the radial protrusion 24 form an inner wire. In the case of the bicycle control cable 12, an outer case 26 is provided over a majority of the central wire 22 and the radial protrusion 24. The inner wire (i.e., the central wire 22 and the radial protrusion 24) slides within the outer case 26. In other words, the central wire 22 and the radial protrusion 24 are configured and arranged to slidably move together in an axial direction with respect to a center longitudinal axis A of the central wire 22 within the outer case 26 to operate a bicycle component (e.g., the front derailleur in FIG. 1). The ends of the inner wire (i.e., the central wire 22 and the radial protrusion 24) protrude beyond both ends of the outer case 26. One end of the central wire 22 is connected to the brake lever (i.e., a manually operated part), while the other end of the central wire 22 is connected to the brake caliper a cable-operated part).

The outer case 26 can be any type of outer case that can be used to slidably support the inner wire (i.e., the central wire 22 and the radial protrusion 24). For example, the outer case 26 preferably includes a synthetic resin liner, a flat steel wire wound helically onto an outside circumference of the synthetic resin liner, and a synthetic resin jacket that covers an outside circumference of the flat steel wire. For the sake of illustration, the synthetic resin liner, the flat steel wire and the synthetic resin jacket are illustrated as a solid synthetic resin tube in FIG. 5. The outer case 26 can be a continuous tube that surrounds one portion of an axial length of the central wire 22 and the radial protrusion 24.

Figure 3:
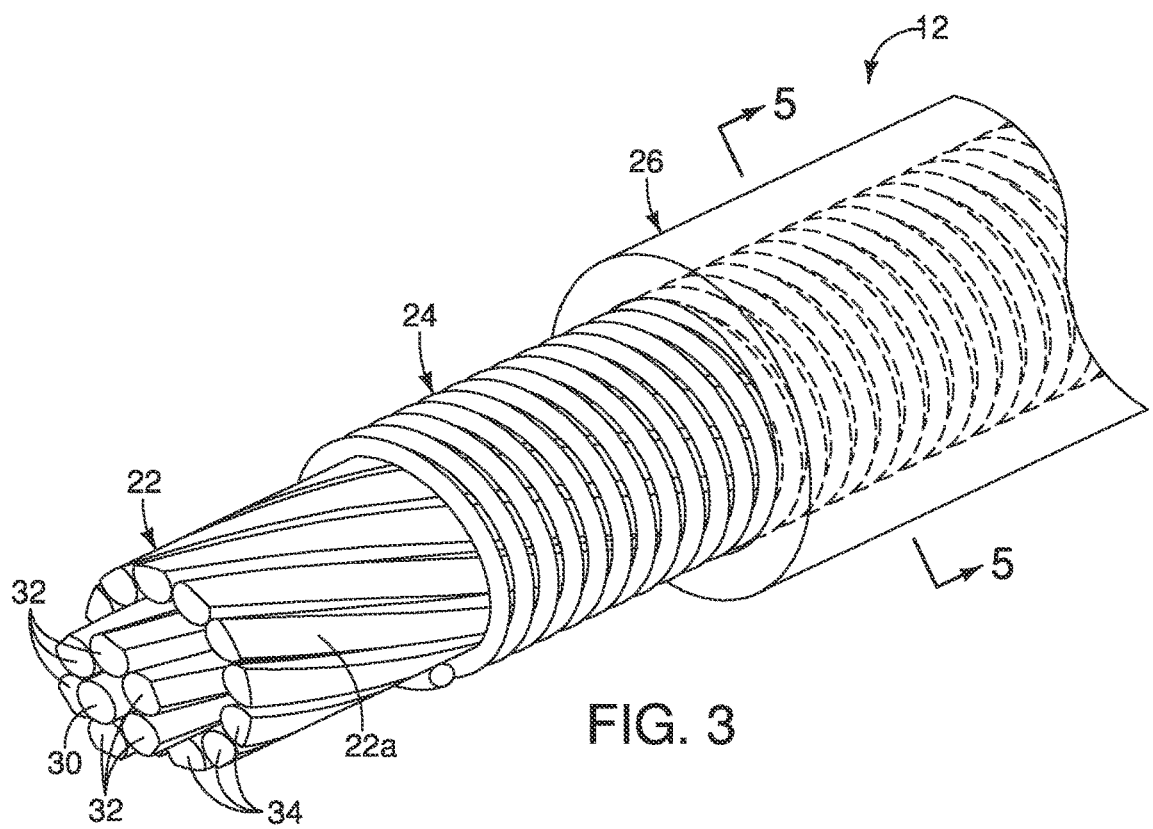
FIG. 3 is an enlarged perspective view of a portion of the bicycle control cable illustrated in FIG. 2 with portions removed for purposes of illustration.
Figure 5:
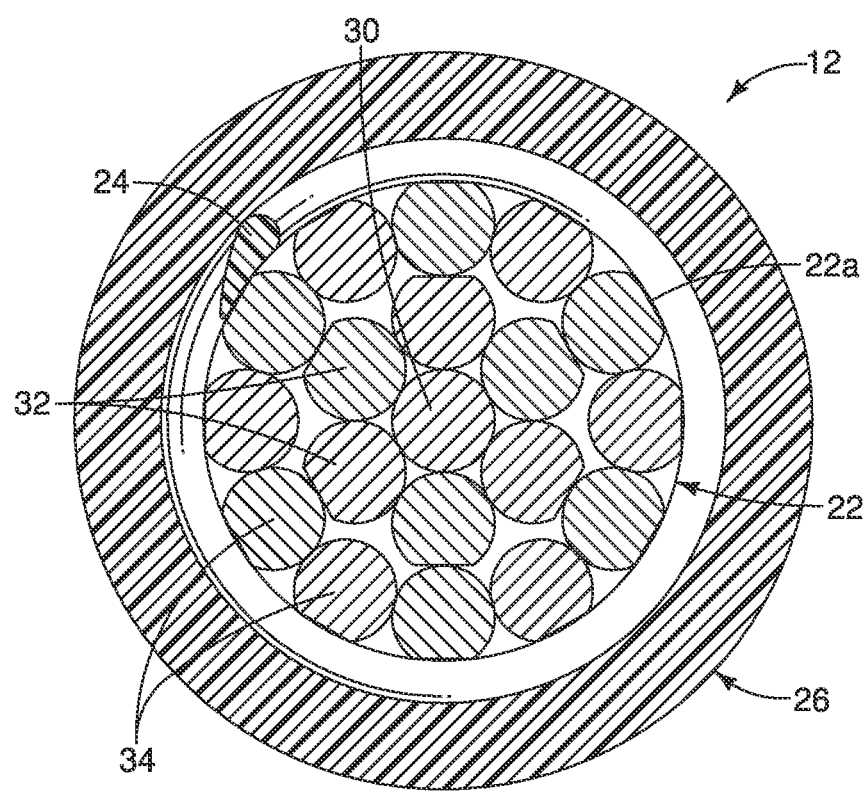
FIG. 5 is a transverse cross sectional view of the bicycle control cable illustrated in FIGS. 2 to 4 as seen along section line 5-5 of FIG. 3.
Figure 6:
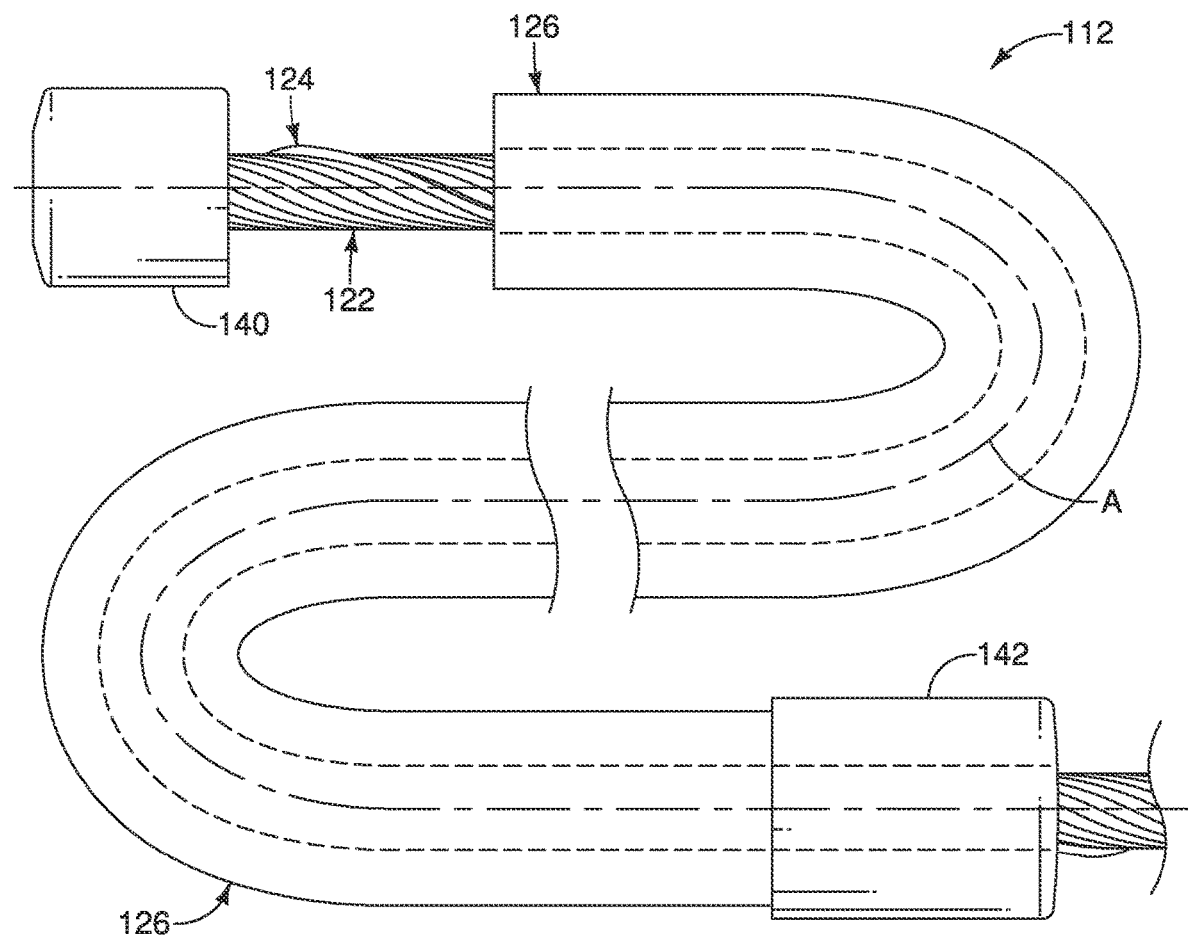
FIG. 6 is a side elevational view of a bicycle control cable illustrated in accordance with a second embodiment.

As best seen in FIGS. 3 and 5, in the first illustrated embodiment, the central wire 22 includes a center metallic strand 30, a plurality of middle metallic strands 32 and a plurality of outer metallic strands 34. The metallic strands 30, 32 and 34 are helically wound to form a wire with a circular cross section. In the first illustrated embodiment, the central wire 22 has an outermost diameter of about 1.1 millimeters. Alternatively, the central wire 22 can be a single metallic strand. In the first illustrated embodiment, the outer metallic strands 34 define a radially outermost surface 22a of the central wire 22. Thus, in the first illustrated embodiment, the central wire 22 is made of helically wound steel wire strands.

Figure 2:
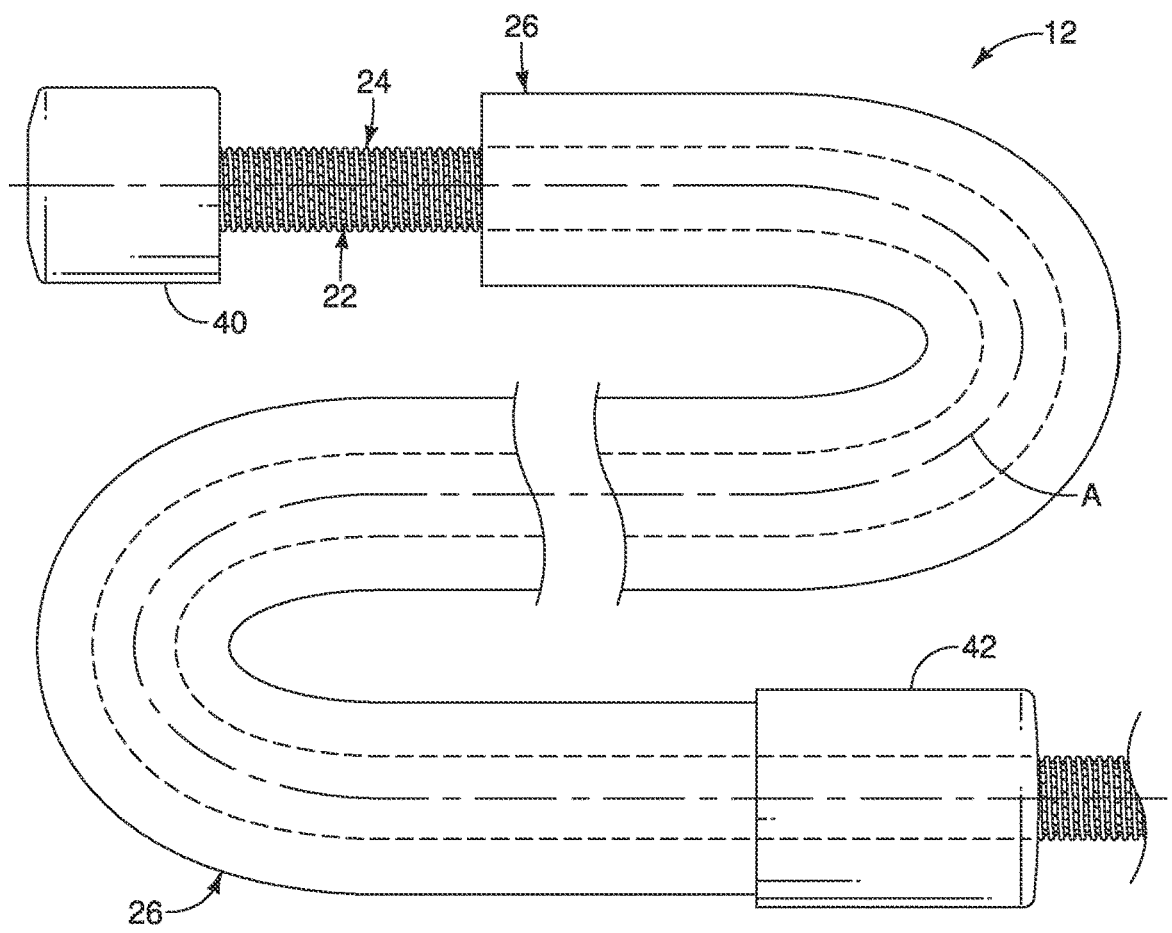
FIG. 2 is a side elevational view of one of the bicycle control cables illustrated in FIG. 1 in accordance with a first embodiment.

As best seen in FIG. 2, in the first illustrated embodiment, the radial protrusion 24 extends along the radially outermost surface 22a in a direction intersecting with a center longitudinal axis A of the central wire 22. As a result, the radial protrusion 24 spaces the radially outermost surface 22a of the central wire 22 from an innermost surface of the outer case 26. In this way, the radial protrusion 24 reduces a sliding resistance of the central wire 22 within the outer case 26. In other words, by providing the radial protrusion 24 on the radially outermost surface 22a of the central wire 22, less contact occurs between the innermost surface of the outer case 26 and the inner wire (i.e., the central wire 22 and the radial protrusion 24).

Figure 4:
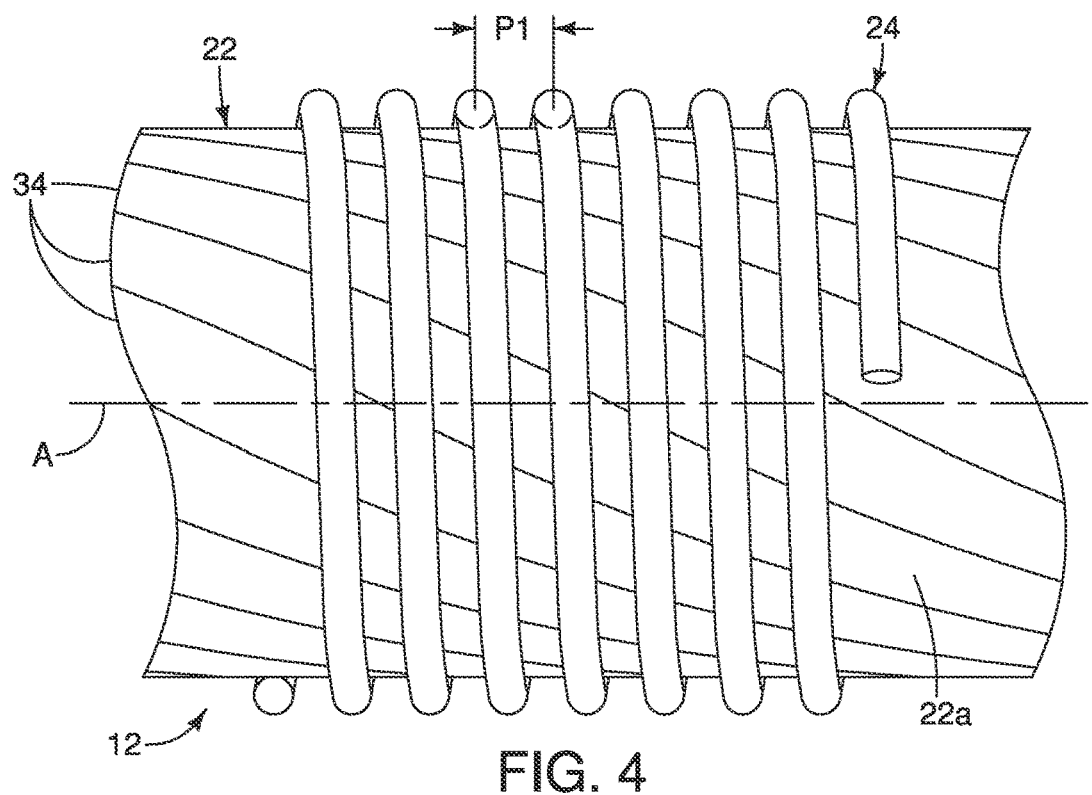
FIG. 4 is an enlarged side elevational view of a portion of the inner wire of the bicycle control cable illustrated in FIGS. 2 and 3.

Preferably, as best seen in FIGS. 3 to 5, in the first illustrated embodiment, the radial protrusion 24 includes at least one resin string that is spirally wound around the radially outermost surface 22a of the central wire 22. In the first illustrated embodiment, the string forming the radial protrusion 24 has a circular cross section with a diameter of about 80 micrometers as compared to the diameter of the central wire 22 which is about 1.1 millimeters. As best seen in FIG. 5, the radial protrusion 24 (the at least one resin string) has a diameter that is smaller than the diameters of each of the metallic strands 30, 32 and 34 of the central wire 22.

While the radial protrusion 24 is illustrated as a single resin string, the radial protrusion 24 can have other configurations. For example, the radial protrusion 24 can be made of a plurality of helically wound resin strings. As seen in FIG. 4, the radial protrusion 24 (the at least one resin string) has a pitch P1 that is less than or equal to 1 millimeter. Preferably, the pitch P1 of the radial protrusion 24 (the at least one resin string) is less than or equal to 500 micrometers, and more preferably about 150 micrometers as illustrated.

Preferably, the radial protrusion 24 is made of a material that has a lower coefficient of friction than the material of the central wire 22 to reduce sliding resistance of the central wire 22 within the outer case 26. In the first illustrated embodiment, the radial protrusion 24 (the at least one resin string) is preferably made of either a fluorocarbon polymer or an olefin polymer. Alternatively, the radial protrusion 24 (the at least one resin string) is preferably made of polyethylene terephthalate (PET). If the radial protrusion 24 is made of a fluorocarbon polymer, then the fluorocarbon polymer is preferably selected from a group consisting of perfluoroalkoxy (PFA), fluoroethylene-propylene (FEP) and polytetrafluoroethylene (PTFE). If the radial protrusion 24 is made of an olefin polymer, then the olefin polymer is preferably selected from a group consisting of polyethylene (PE) and polyacetal (POM).

Referring back to FIGS. 1 and 2, the bicycle control cables 14, 16 and 18 are identical as the bicycle control cable 12, as discussed, except for the length of the cables, the diameters of the inner wire and the outer case and the number of pieces of the outer case. In others words, the bicycle control cables 14, 16 and 18 are adapted to the cabling path on the bicycle 10 and the manually operated part and the cable-operated part that are connected to the ends of the inner wire (the central wire and the radial protrusion). Thus, the bicycle control cables 14, 16 and 18 will not be discussed or illustrated in detail herein. Depending on the cabling path of the bicycle control cables 12, 14, 16 and 18 on the bicycle 10 and the bicycle components being attached thereto, one end or each end of the inner wire (the central wire and the radial protrusion) of the bicycle control cables 12, 14, 16 and 18 can be provided with an anchor part or nipple 40 such as shown in FIG. 2. The anchor part 40 can be fixed to the tip end of the inner wire (i.e. the central wire and the radial protrusion) by crimping or other suitable fastening method. Also one end or each end of the outer case of the bicycle control cables 12, 14, 16 and 18 can be provided with a cap 42 for engaging one of the stops 20 or for engaging the bicycle component being attached thereto.

Referring now to FIGS. 6 to 9, a bicycle control cable 112 will now be explained in accordance with a second embodiment. The bicycle control cable 112 basically, includes a central wire 122 and a radial protrusion 124. Preferably, as shown, the radial protrusion 124 and the central wire 122 are attached to each other by thermal melting. In this way, the radial protrusion 124 does not move relative to the central wire 122. The central wire 122 and the radial protrusion 124 form an inner wire. An outer case 126 is provided over a majority of the central wire 122 and the radial protrusion 124. The bicycle control cables 12 and 112 are identical except that the radial protrusions 24 and 124 are different and one of the outer metallic strands of the central wire 122 has been eliminated in the bicycle control cable 112. In view of the similarity between the first and second embodiments, the description of the outer case 126, which is identical to the outer case 26, has been omitted for the sake of brevity.

The inner wire (i.e., the central wire 122 and the radial protrusion 124) slides within the outer case 126. The ends of the inner wire (i.e., the central wire 122 and the radial protrusion 124) protrude beyond both ends of the outer case 126. One end of the central wire 122 is connected to a manually operated part, while the other end of the central wire 122 is connected to a cable-operated part.

Figure 7:
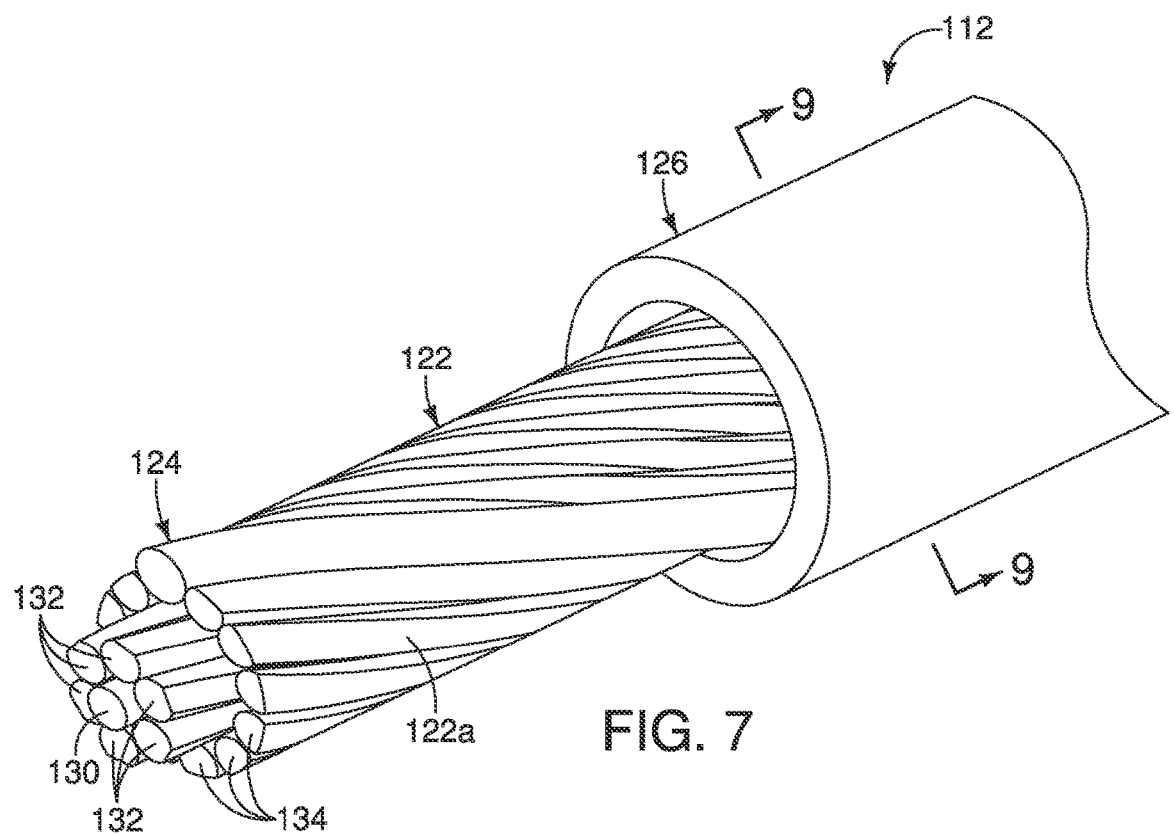
FIG. 7 is an enlarged perspective view of a portion of the bicycle control cable illustrated in FIG. 6 with portions removed for purposes of illustration.
Figure 9:
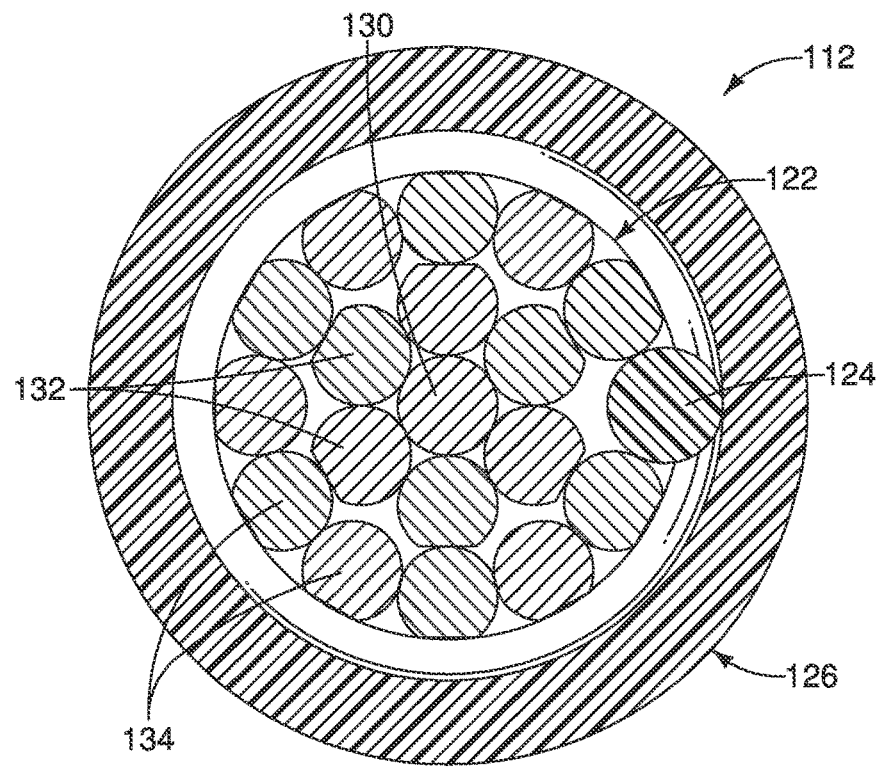
FIG. 9 is a transverse cross sectional view of the bicycle control cable illustrated in FIGS. 6 to 8 as seen along section line 9-9 of FIG. 7.

As best seen in FIGS. 7 and 9, in the second illustrated embodiment, the central wire 122 includes a center metallic strand 130, a plurality of middle metallic strands 132 and a plurality of outer metallic strands 134. The metallic strands 130, 132 and 134 are helically wound to form a wire with a circular cross section. In the second illustrated embodiment, the central wire 122 has an outermost diameter of about 1.1 millimeters. Alternatively, the central wire 122 can be a single metallic strand. In the second illustrated embodiment, the outer metallic strands 134 define a radially outermost surface 122a of the central wire 122. Thus, like the first embodiment, the central wire 122 of the second embodiment is made of helically wound steel wire strands.

Preferably, in the second illustrated embodiment, the radial protrusion 124 includes at least one resin string that is spirally wound around the radially outermost surface 122a of the central wire 122. The string forming the radial protrusion 124 has a circular cross section with a diameter of about 500 micrometers, before the radial protrusion 124 is spirally wound around the radially outermost surface 122a of the central wire 122, as compared to the outermost diameter of the central wire 122 which is about 1.1 millimeters. As best seen in FIG. 5, the radial protrusion 124 (the at least one resin string) has a diameter that is larger than the diameters of each of the metallic strands 130, 132 and 1134 of the central wire 122. While preferably all of the metallic strands 130, 132 and 134 are about the same size, the metallic strands 130, 132 and 134 can have different sizes. For example, some of the metallic strands 130, 132 and 134 are equal to or smaller than the diameter of the radial protrusion 124 (the at least one resin string) and the one or more of the metallic strands 130 and 132 is larger than the diameter of the radial protrusion 124 (the at least one resin string).

While the radial protrusion 124 is illustrated as a single resin string, the radial protrusion 124 can have other configurations, for example, the radial protrusion 124 can be made of a plurality of helically wound resin strings. Preferably, the radial protrusion 124 is a stretched resin string manufactured through a stretching process so that wear-proof property of the radial protrusion 124 is more improved.

Preferably, the radial protrusion 124 is made of a material that has a lower coefficient of friction than the material of the central wire 122 to reduce sliding resistance of the central wire 122 within the outer case 126. The radial protrusion 124 (the at least one resin string) is made of either a fluorocarbon polymer or an olefin polymer. Alternatively, the radial protrusion 124 (the at least one resin string) is made of polyethylene terephthalate (PET). If the radial protrusion 124 is made of a fluorocarbon polymer, then the fluorocarbon polymer is preferably selected from a group consisting of perfluoroalkoxy (PFA), fluoroethylene-propylene (FEP) and polytetrafluoroethylene (PTFE). If the radial protrusion 124 is made of an olefin polymer, then the olefin polymer is preferably selected from a group consisting of polyethylene (PE) and polyacetal (POM).

Figure 10:
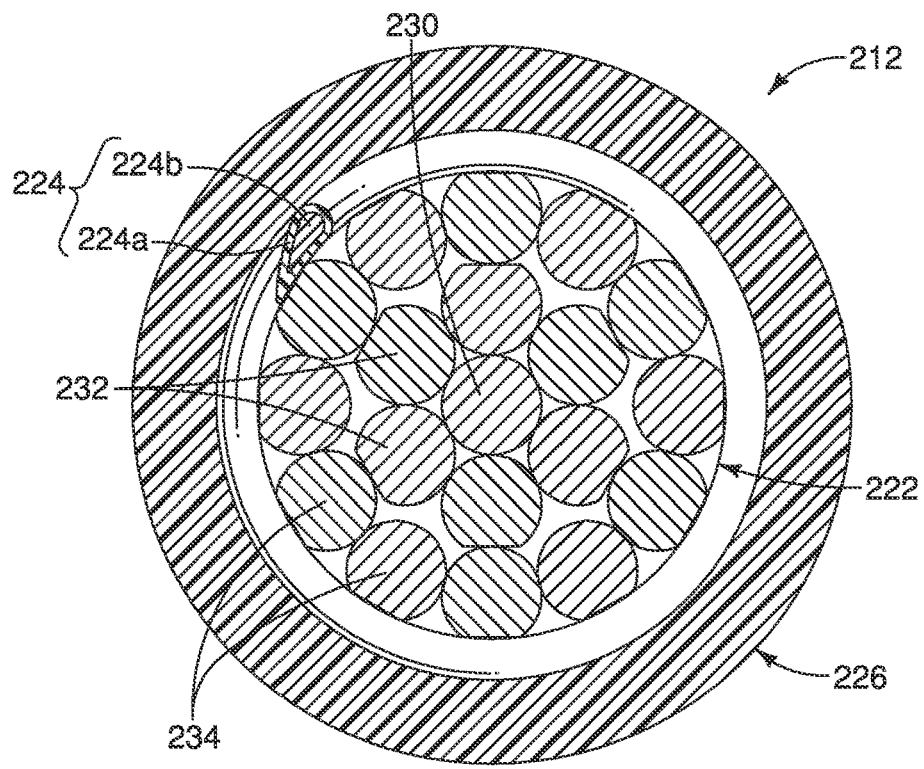
FIG. 10 is a transverse cross sectional view of a bicycle control cable in accordance with a third embodiment.

Referring now to FIG. 10, a bicycle control cable 212 will now be explained in accordance with a third embodiment. The bicycle control cable 212 basically, includes a central wire 222 and a radial protrusion 224. The central wire 222 and the radial protrusion 224 form an inner wire. The central wire 222 includes a center metallic strand 230, a plurality of middle metallic strands 232 and a plurality of outer metallic strands 234. An outer case 226 is provided over a majority of the central wire 222 and the radial protrusion 224. The bicycle control cables 12 and 212 are identical except that the radial protrusions 24 and 224 are different. In view of the similarity between the first and third embodiments, the descriptions of the central wire 222 and the outer case 226, which are identical to the central wire 22 and the outer case 26 have been omitted for the sake of brevity.

Here, the radial protrusion 224 includes at least one resin string that is spirally wound around the central wire 222. The radial protrusion 224 is spirally wound around the central wire 222 in the same manner as shown in FIGS. 3 and 4 of the first embodiment. Thus, the description of the spirally winding of the radial protrusion 24 applies to the spirally winding of the radial protrusion 224. The radial protrusion 224 has an outer shell 224a and an inner core 224b. As seen in FIG. 10, the inner core 224b is formed by at least one metallic wire. While the inner core 224b is illustrated as a single metallic wire, the inner core 224b can have other configurations. For example, the inner core 224b can be made of a plurality of helically wound metallic wires. The inner core 224b (e.g., the metallic wire) is coated with a solid lubricant that forms the outer shell 224a. The string forming the radial protrusion 224 has a circular cross section with a diameter of about 80 micrometers.

Here, the solid lubricant of the outer shell 224a is preferably made of either a fluorocarbon polymer or an olefin polymer. Alternatively, the outer shell 224a is preferably made of polyethylene terephthalate (PET). If the solid lubricant of the outer shell 224a is made of a fluorocarbon polymer, then the fluorocarbon polymer is preferably selected from a group consisting of perfluoroalkoxy (PFA), fluoroethylene-propylene (FEP) and polytetrafluoroethylene (PTFE). If the solid lubricant of the outer shell 224a is made of an olefin polymer, then the olefin polymer is preferably selected from a group consisting of polyethylene (PE) and polyacetal (POM).

Figure 11:
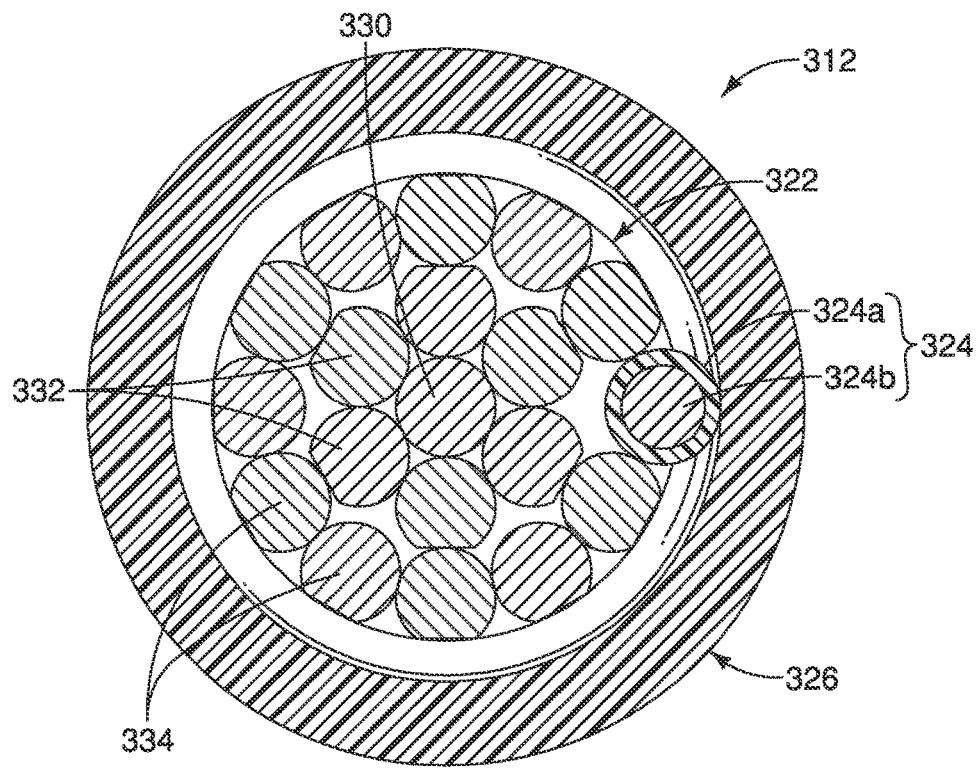
FIG. 11 is a transverse cross sectional view of a bicycle control cable in accordance with a fourth embodiment.

Referring now to FIG. 11, a bicycle control cable 312 will now be explained in accordance with a fourth embodiment. The bicycle control cable 312 basically, includes a central wire 322 and a radial protrusion 324. The central wire 322 and the radial protrusion 324 form an inner wire. The central wire 322 includes a center metallic strand 330, a plurality of middle metallic strands 332 and a plurality of outer metallic strands 334. An outer case 326 is provided over a majority of the central wire 322 and the radial protrusion 324. The bicycle control cables 112 and 312 are identical except that the radial protrusions 124 and 324 are different. In view of the similarity between the second and fourth embodiments, the descriptions of the central wire 322 and the outer case 326, which are identical to the central wire 122 and the outer case 126 have been omitted for the sake of brevity.

Figure 8:
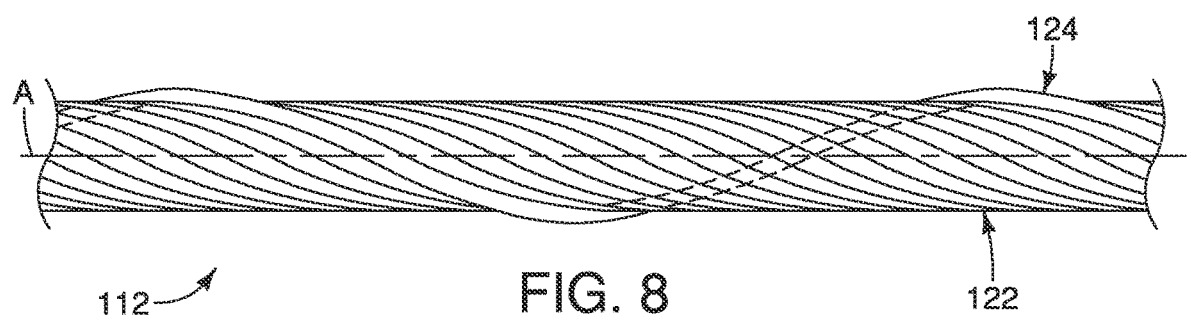
FIG. 8 is an enlarged side elevational view of a portion of the inner wire of the bicycle control cable illustrated in FIGS. 6 and 7.

Here, the radial protrusion 324 includes at least one resin string that is spirally wound around the central wire 322. The radial protrusion 324 is spirally wound around the central wire 322. In the same manner as shown in FIGS. 7 and 8 of the second embodiment. Thus, the description of the spirally winding of the radial protrusion 124 applies to the spirally winding of the radial protrusion 324. The radial protrusion 324 has an outer shell 324a and an inner core 324b. As seen in FIG. 11, the inner core 324b is formed by at least one metallic wire. While the inner core 324b is illustrated as a single metallic wire, the inner core 324b can have other configurations. For example, the inner core 324b can be made of a plurality of helically wound metallic wires. The inner core 324b (e.g., the metallic wire) is coated with a solid lubricant that forms the outer shell 324a. The string forming the radial protrusion 324 has a circular cross section with a diameter of about 500 micrometers before the radial protrusion 324 is spirally wound around the radially outermost surface 322a of the central wire 322.

Here, the solid lubricant of the outer shell 324a is preferably made of either a fluorocarbon polymer or an olefin polymer. Alternatively, the outer shell 324a is preferably made of polyethylene terephthalate (PET). If the solid lubricant of the outer shell 324a is made of a fluorocarbon polymer, then the fluorocarbon polymer is preferably selected from a group consisting of perfluoroalkoxy (PFA), fluoroethylene-propylene (FEP) and polytetrafluoroethylene (PTFE). If the solid lubricant of the outer shell 324a is made of an olefin polymer, then the olefin polymer is preferably selected from a group consisting of polyethylene (PE) and polyacetal (POM).

Figure 12:
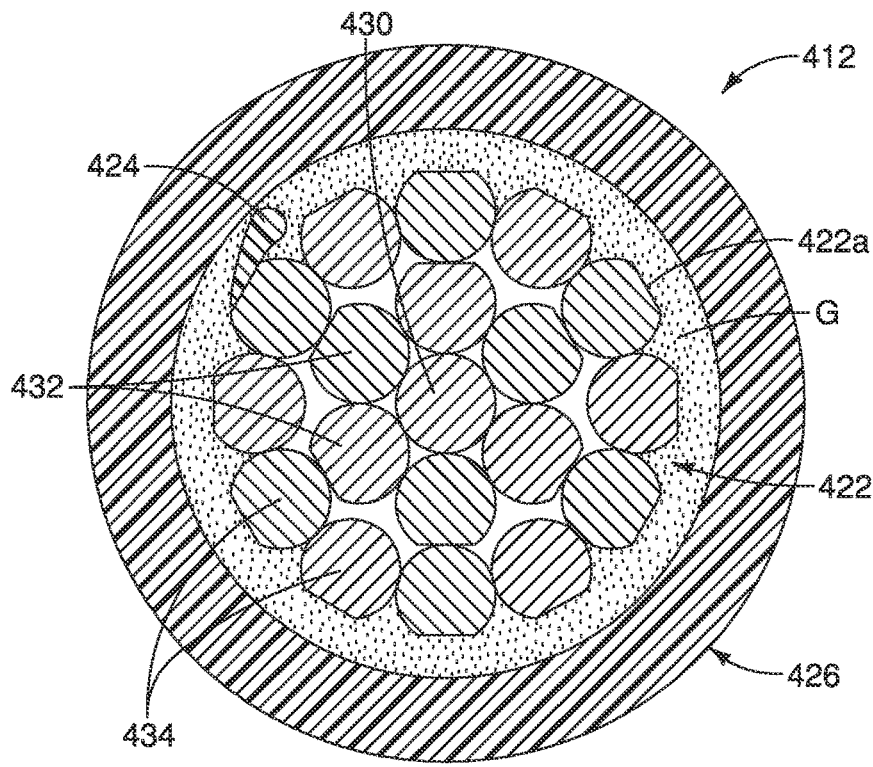
FIG. 12 is a transverse cross sectional view of a bicycle control cable in accordance with a fifth embodiment.

Referring now to FIG. 12, a bicycle control cable 412 will now be explained in accordance with a fifth embodiment. The bicycle control cable 412 basically, includes a central wire 422 and a radial protrusion 424. The central wire 422 and the radial protrusion 424 form an inner wire. The central wire 422 includes a center metallic strand 430, a plurality of middle metallic strands 432 and a plurality of outer metallic strands 434. An outer case 426 is provided over a majority of the central wire 422 and the radial protrusion 424. The bicycle control cable 412 is identical to the bicycle control cable 12, as described above, except that a coating of grease G is applied over the central wire 422 and the radial protrusion 424 so that the grease G is provided in the pitches of the radial protrusion 424. Since the radial protrusion 424 includes at least one string that is spirally wound around the central wire 422, the radially outermost surface of the central wire 422 is exposed in areas between corresponding circumferential points of the radial protrusion 424 at each pitch of the radial protrusion 424. Thus, the grease G interpenetrates between the outer metallic strands 434 of the central wire 422, preferably up to between the middle metallic strands 432 and the center metallic strand 430, through the exposed portion of the radially outermost surface of the central wire 422 so that friction resistance between the metallic strands of the central wire 422 can be reduced during operation of the bicycle control cable 412. In this way, the exposed portion of the radially outermost surface of the central wire 422 between the windings of the radial protrusion 424 is filled by the grease G so that sliding resistance between the outer case 426 and the central wire 422 with the radial protrusion 424 can be reduced during operation of the bicycle control cable 412. Since the bicycle control cables 12 and 412 are identical, except for the coating of grease G, the descriptions of the central wire 422, the radial protrusion 424 and the outer case 426 have been omitted for the sake of brevity.

Figure 13:
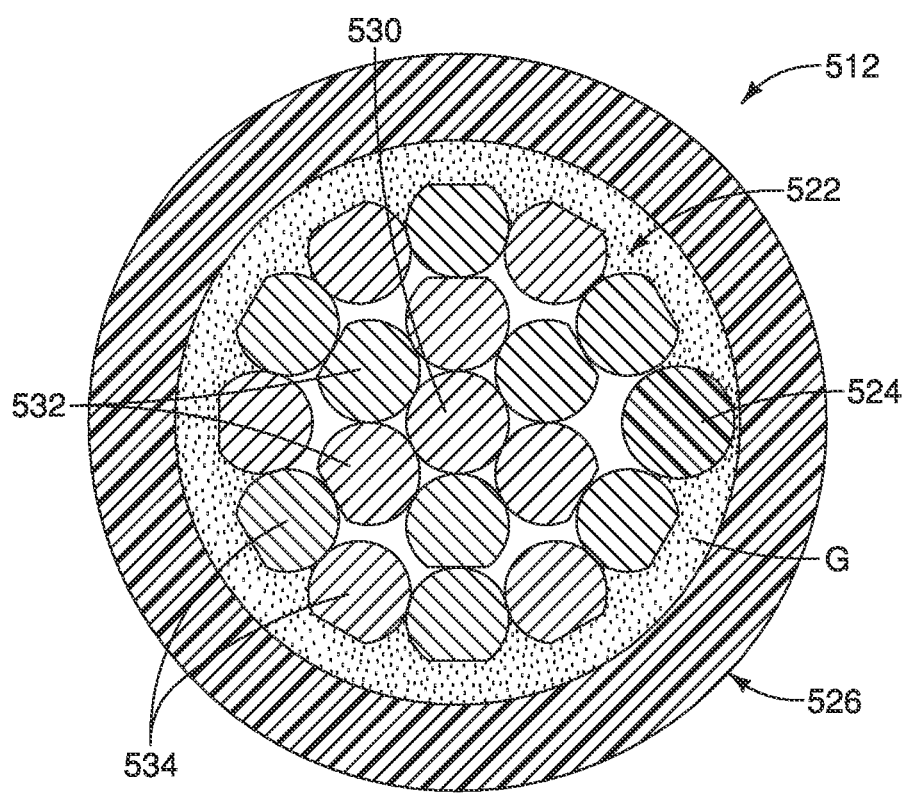
FIG. 13 is a transverse cross sectional view of a bicycle control cable in accordance with a sixth embodiment.

Referring now to FIG. 13, a bicycle control cable 512 will now be explained in accordance with a sixth embodiment. The bicycle control cable 512 basically, includes a central wire 522 and a radial protrusion 524. The central wire 522 and the radial protrusion 524 form an inner wire. The central wire 522 includes a center metallic strand 530, a plurality of middle metallic strands 532 and a plurality of outer metallic strands 534. An outer case 526 is provided over a majority of the central wire 522 and the radial protrusion 524. The bicycle control cable 512 is identical to the bicycle control cable 112, as described above, except that a coating of grease G is applied over the central wire 522 and the radial protrusion 524. Since the radial protrusion 524 includes at least one string that is spirally wound around the central wire 522, the radially outermost surface of the central wire 522 is exposed in areas between corresponding circumferential points of the radial protrusion 524 at each pitch of the radial protrusion 524. Thus, the grease G interpenetrates between the outer metallic strands 534 of the central wire 522, preferably up to between the middle metallic strands 532 and the center metallic strand 530, through the exposed portion of the radially outermost surface of the central wire 522 so that friction resistance between the metallic strands of the central wire 522 can be reduced during operation of the bicycle control cable 512. In this way, the exposed portion of the radially outermost surface of the central wire 522 between the windings of the radial protrusion 524 is filled by the grease G so that sliding resistance between the outer case 526 and the central wire 522 with the radial protrusion 524 can be reduced during operation of the bicycle control cable 512. Since the bicycle control cables 112 and 512 are identical, except for the coating of grease G, the descriptions of the central wire 522, the radial protrusion 524 and the outer case 526 have been omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired, except if specifically defined. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control cable configured to be mounted to a bicycle comprising:
   a central wire including at least one metallic strand defining a radially outermost surface of the central wire; and
   at least one string made of resin spirally wound onto the radially outermost surface in a direction intersecting with a center longitudinal axis of the central wire, the at least one resin string having a spacing between adjacent windings of the at least one resin string with a pitch between the adjacent windings being less than or equal to 1 millimeter, the at least one resin string defining an outer sliding surface for reducing a sliding resistance of the central wire, grease being applied over the at least one resin string and the central wire, at least a portion of the grease being disposed in the spacing between adjacent windings, the central wire and the at least one resin string being configured and arranged to slidably move in an axial direction with respect to the center longitudinal axis of the central wire within an outer case, the at least one resin string being thermally melted directly to the radially outermost surface of the central wire, and the at least one metallic strand including a plurality of metallic strands and the at least one resin string having a diameter that is smaller than a diameter of each of the plurality of metallic strands.

2. The bicycle control cable according to claim 1, wherein the pitch between the adjacent windings is less than or equal to 500 micrometers.

3. The bicycle control cable according to claim 1, wherein least one resin string is made of fluorocarbon polymer.

4. The bicycle control cable according to claim 3, wherein the fluorocarbon polymer is selected from a group consisting of perfluoroalkoxy, fluoroethylene-propylene and polytetrafluoroethylene.

5. The bicycle control cable according to claim 1, wherein the at least one resin string is made of an olefin polymer.

6. The bicycle control cable according to claim 5, wherein the olefin polymer is selected from a group consisting of polyethylene and polyacetal.

7. The bicycle control cable according to claim 1, wherein the at east one resin string is made of polyethylene terephthalate.

8. The bicycle control cable according to claim 1, wherein the grease fills the spiral gap.

9. The bicycle control cable according to claim 8, wherein the grease penetrates the central wire.

10. The bicycle control cable according to claim 1, wherein
the outer case surrounds at least a portion of an axial length of the central wire, an innermost surface of the outer case being spaced from the radially outermost surface of the central wire by the at least one resin string.

11. The bicycle control cable according to claim 10, wherein
the grease is arranged between an outermost surface of the central wire and the innermost surface of the outer case.

* * * * *